United States Patent [19]
Baron

[11] Patent Number: 5,461,784
[45] Date of Patent: Oct. 31, 1995

[54] CIRCULAR-BLADED PRUNING SHEARS WITH HOLDING ACTION

[76] Inventor: Joseph Baron, 229 Ave. Vista del Oceano, San Clemente, Calif. 92672

[21] Appl. No.: 304,166

[22] Filed: Sep. 12, 1994

[51] Int. Cl.⁶ ........................................................ B26B 1/00
[52] U.S. Cl. ............................ 30/135; 30/134; 30/298
[58] Field of Search ............................. 30/124, 134, 135, 30/286, 295, 296.1, 298, 301, 306, 307, 317

[56] References Cited

U.S. PATENT DOCUMENTS

| | | | |
|---|---|---|---|
| 127,279 | 5/1872 | Spielman | 30/135 |
| 233,410 | 10/1880 | Hale | 30/134 |
| 403,500 | 5/1889 | Wingenroth | 30/135 |
| 594,072 | 11/1897 | Forde | 30/134 |
| 921,402 | 5/1909 | Houck | 30/135 |
| 2,012,648 | 8/1935 | Wheeler | 30/134 |
| 2,775,032 | 12/1956 | Sorensen | 30/134 |
| 4,348,808 | 9/1982 | Nalbandyan | 30/134 |
| 4,528,752 | 7/1985 | Benedict | 30/298 |
| 4,696,107 | 9/1987 | Held | 30/246 |
| 5,058,278 | 10/1991 | Colvin | 30/298 |

*Primary Examiner*—Hwei-Siu Payer
*Attorney, Agent, or Firm*—Walter A. Hackler

[57] ABSTRACT

Circular-bladed pruning apparatus with holding action includes a mechanism for securing a severed branch of a plant from the moment the branch is cut until a user chooses to release the branch. A rotatable, indexed, circular blade is included, as well as a handle for operating both the cutting mechanism and the holding mechanism. The present invention may also include shields designed to protect a user's hand and arm from injury resulting from harmful plant contact.

19 Claims, 4 Drawing Sheets

CIRCULAR-BLADED PRUNING SHEARS WITH HOLDING ACTION

The present invention generally relates to gardening, in particular to pruning shears with holding action, designed to allow single-handed, safe, one-step pruning.

A pruning tool is an important, if not essential, element of even the most basic collection of gardening tools. A gardener often desires to prune a particular branch of a plant. A clean, even cut would be difficult to achieve without the use of quality pruning shears. Furthermore, pruning shears are essential for cutting through particularly thick or tough branches.

Even with a sharp, quality pair of conventional pruning shears, a gardener may find that pruning thorny plants, such as roses, a particularly challenging task. Conventional pruning shears assist a gardener in cutting through a rose's tough stem but the gardener usually must manually handle the cut piece in order to discard or use the piece. It would be highly beneficial for a gardener to be able to prune a plant and discard the cut piece without ever touching the severed piece.

Gardening gloves are traditionally worn in order to protect the gardener's hand from being pricked by thorns during handling of the severed piece. However, it is common for a rose to have thorns that are strong and sharp enough to penetrate a glove and cause injury to the gardener. For this reason, a gardener must not only wear gloves when handling a severed rose plant, but also must chose careful placement of his gloved fingers on the branch to avoid being pricked by the largest thorns. Furthermore, gloved hands can be cumbersome, particularly when the gardener is handling tools, such as pruning shears, that require some level dexterity to operate.

Besides thorny plants, there are countless other plants that can cause mild to severe injury to a person if such plants are not handled properly. Hazardous plants that one may encounter include plants that are poisonous to the touch, such as poison oak or poison ivy; plants that cause uncomfortable reactions in people with particular allergies; cactus-type plants with visible or imperceptible hairlike spines; plants that produce seeds that cling to clothing or skin, for instance, foxtails and nettles; plants harboring biting insects or caterpillars; plants that have been treated with toxic insecticides. Clearly, there are many potentially hazardous situations that one may encounter when dealing with both domesticated and wild plants.

There are many reasons why it would be beneficial for a gardener to be able to prune a plant without ever touching the severed piece. For instance, when a gardener is trimming fruit from trees, he often must stand on a ladder to reach distant branches. Using traditional pruning shears, he will clip the branch, and either grasp the fruit with his free hand if the fruit is near his reach, or let the fruit will drop to the ground. Thus, he will have to choose between releasing his safety hold on the ladder in order to use both hands to prune the fruit, or letting the fruit fall and become bruised. It would be extremely beneficial to such a gardener to have a tool enables single handed pruning. In the same respect, such a tool may be essential to elderly and disabled persons who may not be able to use both hands efficiently.

A gardener often wants to avoid any contact with the plant, even the mere brushing up against the plant with bare skin. Again, gloves are the traditional method of protection. When the gardener reaches through dense foliage, his entire arm may be readily exposed to undesirable plant contact. Because a common gardening glove covers only the hand and wrist of the wearer, it offers inadequate protection to the gardener in this common situation. For this reason, there is a demand for a more protective device than a simple gardening glove. The present invention is directed toward a device that offers such protection.

In addition, the present invention is directed toward overcoming another inadequacy in the common set of gardening tools. As with any instrument that is used for cutting through tough materials, the blade of a pair of pruning shears will inevitably become dull with each increased use and the tool itself will become less effective. The tool will then be discarded and replaced with a new set of pruning shears. Replacement with a new, quality tool is often expensive and thus, a gardener may instead choose to sharpen the blade of an old tool. This requires the gardener to have access to a blade sharpening device or, to pay for having the tool professionally sharpened. Thus, conventional pruning shears, and the blades in particular, have limited durability. Keeping a collection of gardening tools equipped with a useful set of pruning shears can be time-consuming and expensive. For the foregoing reasons, there is a strong need for a gardening tool with a means to easily replace a worn, blunt blade with a new, sharp blade such that the tool itself has lifetime durability.

A traditional set of pruning shears is equipped with a single blade edge. Unfortunately, such a tool may not be able to meet all the demands of a gardener who often must prune many different types and thicknesses of branches. A gardener would benefit from a tool that has a means to easily replace one blade edge with a distinctly different blade edge such that the tool itself suits a variety of pruning needs.

Finally, a gardener who is "left-handed" may have a difficult time using standard pruning shears which are typically designed for right-handed persons. This phenomenon has been attributed to variant force vectors which occur by a change in alignment of fingers and the thumb, which results in a different bias in the cutting blades. Therefore, a left-handed gardener may need to search for a special set of pruning shears that are designed for left-handed use.

SUMMARY OF THE INVENTION

The present invention is directed to an apparatus for pruning plants that satisfies the above needs. In particular, the invention provides a circular-bladed pruning apparatus with holding action.

A unique feature of the present invention allows a gardener, hereinafter referred to as a "user" to prune a branch of a plant and then discard or use the severed piece without the user's hand ever directly contacting the piece. More particularly, an embodiment of the present invention provides a pair of holding edges, operable by a handle means. The holding edges are designed to cooperate with one another such that the pruning apparatus operates to secure a severed piece of the plant from the instant it is cut, and release the severed piece at the moment the user so desires. The severed piece is easily released through use of the handle means. A unique design allows the apparatus to firmly secure even a particularly bulky or heavy branch of a plant, including a branch bearing fruit.

One embodiment of the present invention comprises a rotatable blade with a plurality of sharp cutting arcuate edge portions. This embodiment extends the useful life of the pruning apparatus, since a worn, blunt arcuate edge portion can be quickly replaced by a fresh, sharper arcuate edge portion. The blade may also be replaced in its entirety if required. Furthermore, a related embodiment provides a single blade with a several distinct edges thereon, each edge useful for a particular pruning requirement.

Another embodiment of the present invention provides shield means, for protecting a user from injury due to thorny plants and other hazards. In particular, the shield means may include a sectional shield that partially or totally encloses a user's hand. Another shield may be included which provides more extensive protection by means of a removably attached sleeve shield.

Preferably, the present invention also includes means to provide the proper bias for left-handed users of the apparatus. This may comprise a means for detaching the structural parts of the apparatus and allowing a user to easily reconnect the parts in a reverse order.

BRIEF DESCRIPTION OF THE DRAWINGS

These and other features, aspects and advantages of the present invention will become better understood with regard to the following description, appended claims and accompanying drawings where:

DETAILED DESCRIPTION

Figure 1:
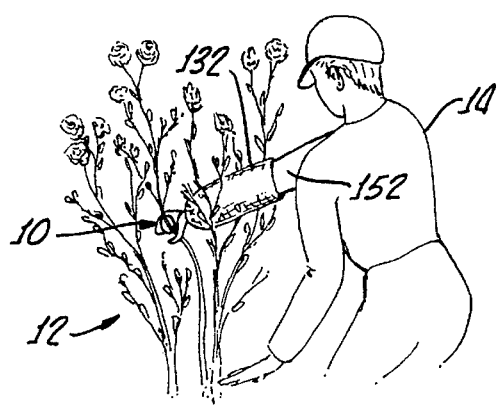
FIG. 1 shows an embodiment of the present invention as it may be used for pruning a rose bush.
Figure 2:
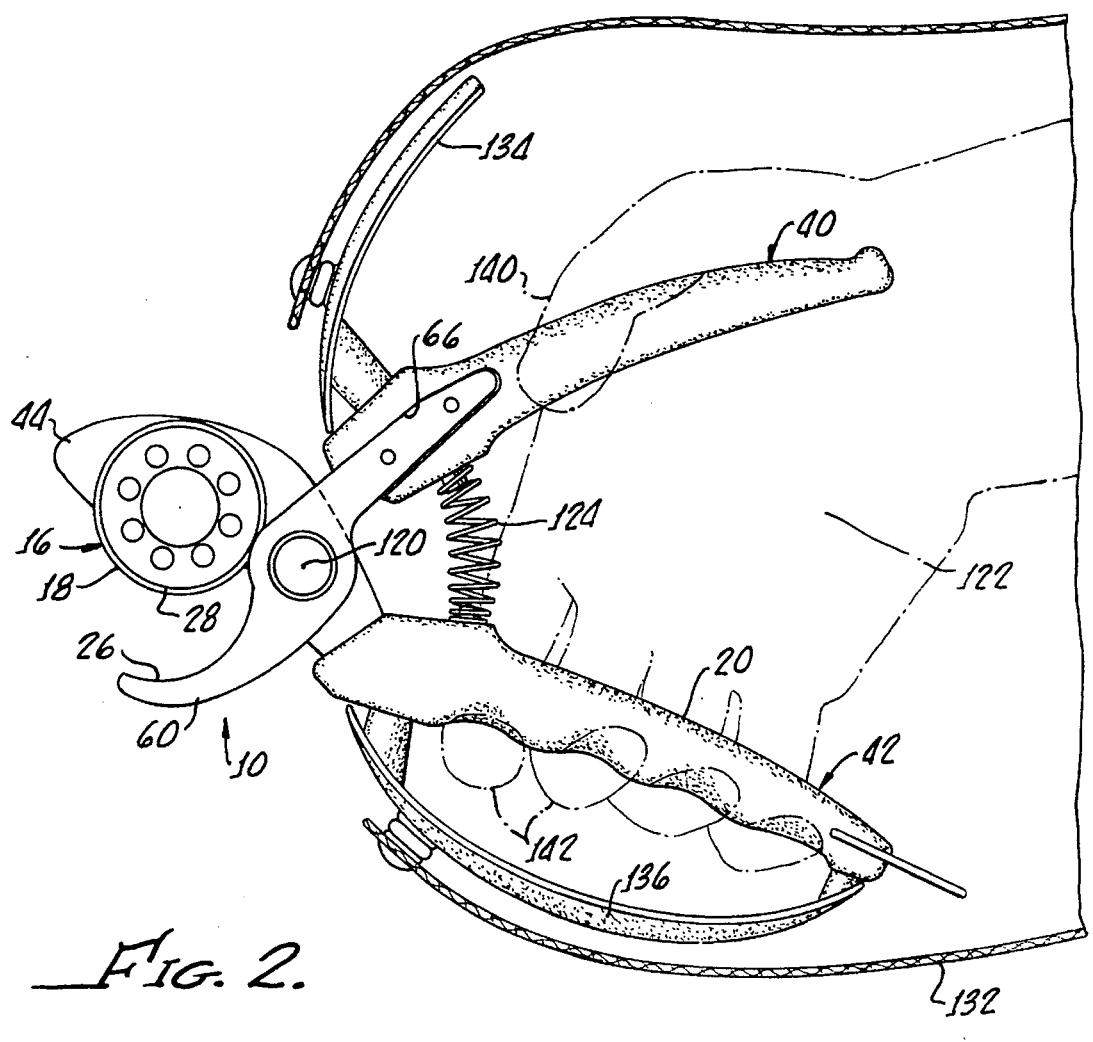
FIG. 2 shows a perspective view of an embodiment of the present invention.

Turning now to FIGS. 1 and 2, there is shown a pruning apparatus 10 in accordance with the present invention as it may be used for pruning internal branches of a thorny bush 12 without subjecting the user 14 to injury. The pruning apparatus 10 generally comprises pruning means 16, including a cutting blade 18 for cutting a plant 12; a handle 20 for operating the pruning means 16; and holding means 22 for securing a severed piece of the plant 12 until the handle 20 is released.

Figure 3:
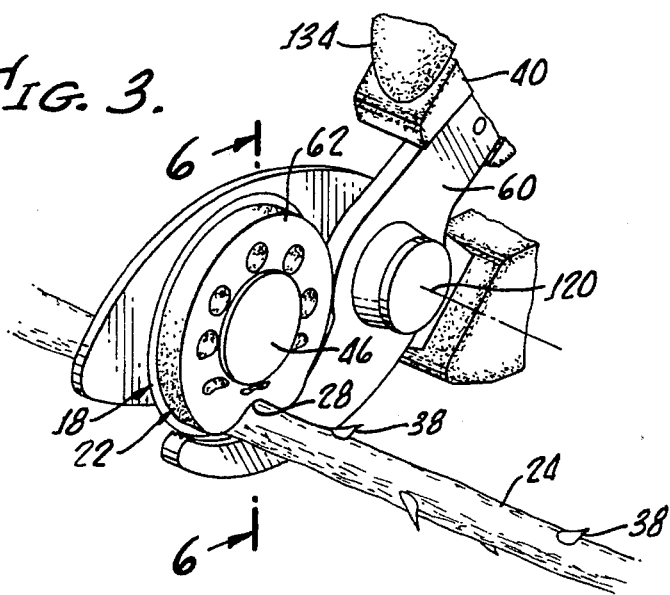
FIG. 3 shows a perspective view of the holding means in a closed position, such that a severed thorned branch is being secured.
Figure 4:
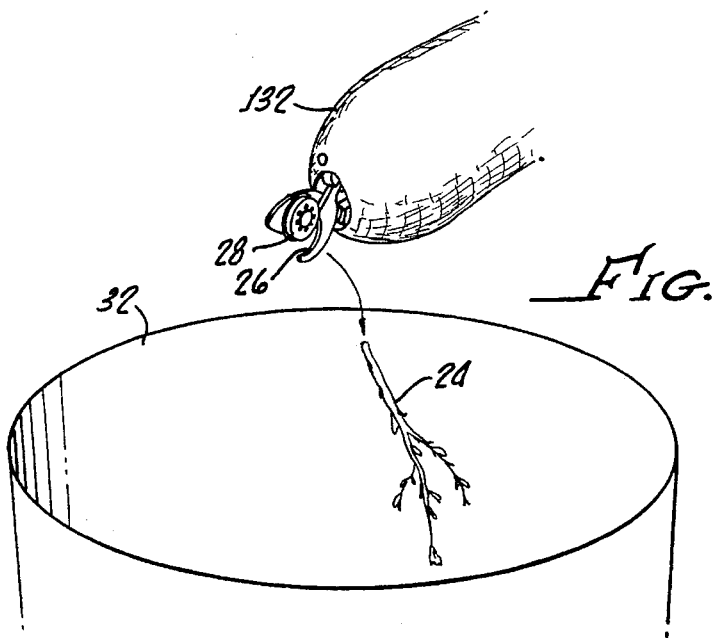
FIG. 4 shows a perspective view of the holding means in an open position, such that a severed thorned branch is released into a trash bin.

FIGS. 3 and 4 shows the holding means 22 in use during pruning of a rose plant 12. The holding means 22 comprises generally a first holding edge 26 and a second holding edge 28. The two holding edges 26, 28 cooperate with each other to secure a severed plant piece 24 at the instant the plant 12 has been cut. A user 14 can then release the piece 24 where and when he so chooses. For example, FIG. 4 illustrates the release of a severed piece 24 into a trash can 32. Each step is accomplished without the user 14 directly contacting the plant 12.

Figure 5:
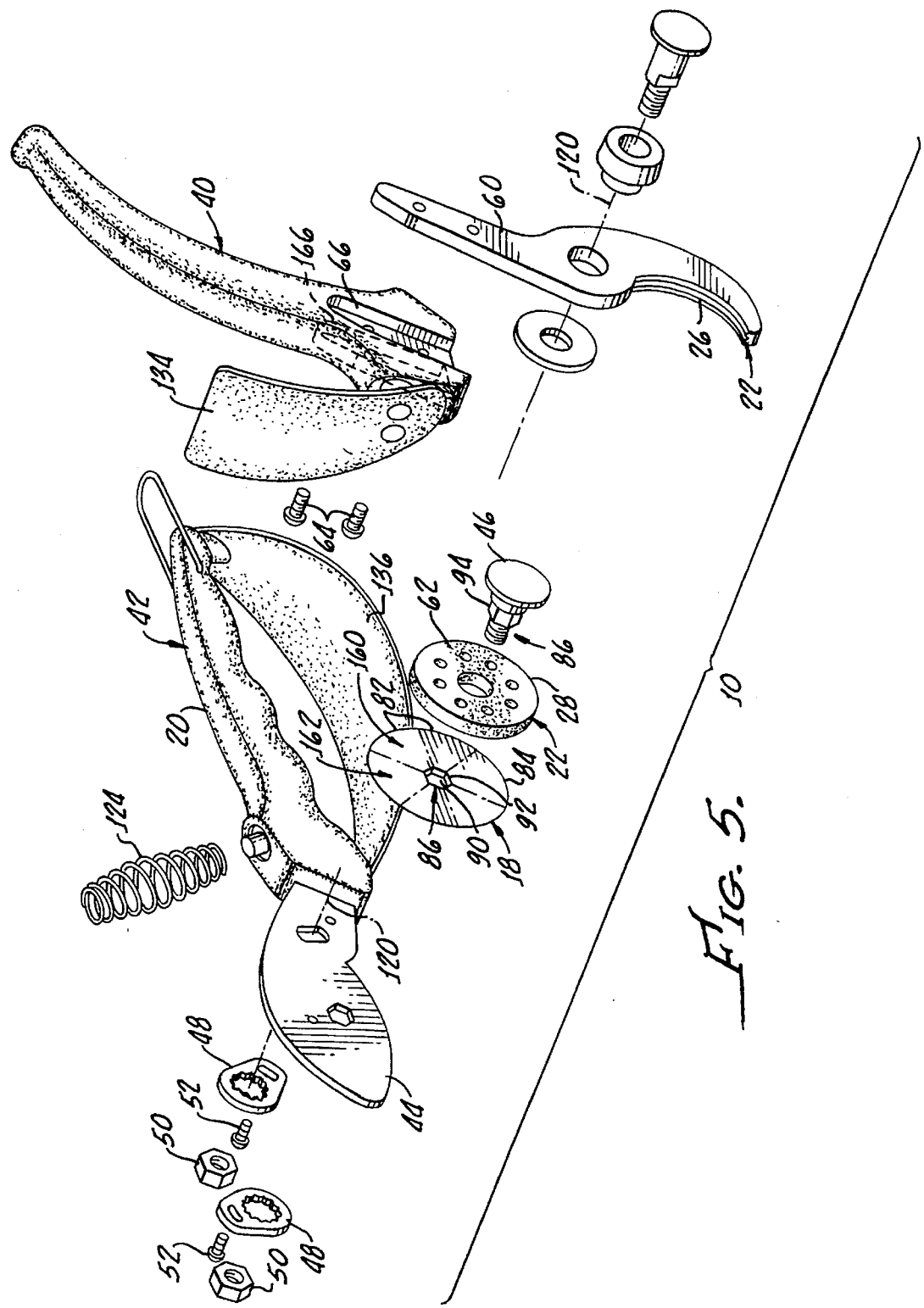
FIG. 5 shows an exploded perspective of an embodiment of the present invention.

FIG. 5 illustrates an exploded perspective of an embodiment of the present invention. Generally, the handle 20 may comprise two levers 40, 42. The pruning means 16 and holding means 22 may be adjacent to the handle 20, and mutually connected to a head 44 of the pruning apparatus 10 by means of bolt 46. A locking washer 48, including nut 50 and screw 52, is provided to enable the effective pruning without undesirable loosening of the blade 18 during repetitive use. As will be discussed next in more detail, the holding means 22 may comprise a first holding edge 26 located along holding jaw 60, and a second holding edge 28 located along disk 62. The holding jaw 60 is fastened to handle 20 by means of screws 64 or other fastening device. Lever 40 of the handle 20 may include notch 66 which supports the holding jaw 60.

Figure 6:
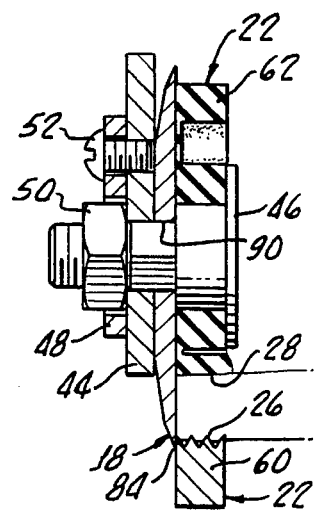
FIG. 6 shows a cross sectional view of a serrated holding edge for holding a severed branch.

More particularly, FIG. 6 shows a cross sectional view of the holding means 22 as it is gripping a severed plant piece 24. Referring to both FIGS. 5 and 6, the holding means 22 is generally comprised of two holding edges 26, 28 which cooperate with one another and provide a unique and effective gripping device.

Figure 7:
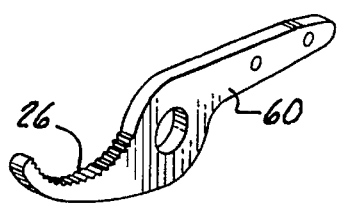
FIG. 7 shows alternative holding edge serrations.

Even more particularly, one holding edge 26 is provided along holding jaw 60 and is preferably serrated. Two different examples of serrations which may be utilized are illustrated. Specifically, longitudinal serrations are shown in FIG. 5 and lateral serrations are shown FIG. 7. Longitudinal serrations are preferable to lateral serrations as they have been found to provide a more effective grip on plant branches.

The second holding edge 28 may be made of any material which will provide adequate friction in cooperation with the first holding edge 26 to secure a plant piece 24. Preferably, the second holding edge 28 is made of a smooth, rubberlike material. A rubberlike second holding edge 28 tends to cooperate favorably with the serrated first holding edge 26. The second holding edge 28 may take the form of an edge along a rubberlike disk 62. When the holding means 22 is in a closed or gripping position, as illustrated in FIG. 3, the second holding edge 28 of the disk 62 securely adjoins the concave edge 26 of the serrated holding jaw 60. Functionally, the second holding edge 28 provides a frictional cushion that grips the severed plant piece 24 in cooperation with the more rigid first holding edge 26. The disk 62 may be provided with open cells 68. These cells 68, in conjunction with the resiliency of the disk 62, allow the disk 62 to deform under the compressive force exerted on a plant branch 24, such that the plant branch 24 is not crushed by the holding means 22.

Figure 8:
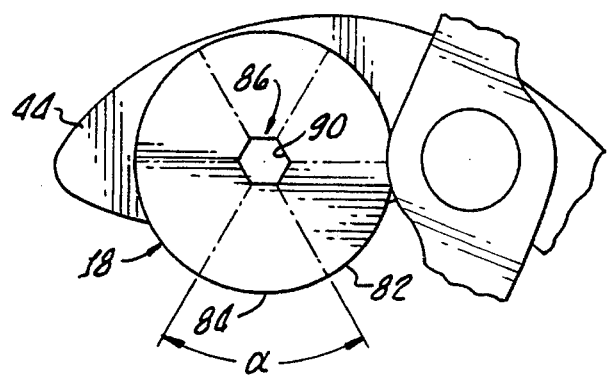
FIG. 8 shows a circular blade and a rotation angle.

Referring now to FIG. 8, a preferred embodiment of the present invention comprises pruning means 16 including a rotatable blade 18. The blade 18 is preferably made of a high quality hardened steel. The blade 18 is preferably circular shaped for facilitating ease of rotation.

The rotatable blade 18 preferably has a uniform cutting edge around its circumference. A user 14 thus can expose a new arcuate edge portion 82 of the blade 18 to replace an old arcuate edge portion 84 by rotating the blade 18 an angle α. Thus after a period of use in which the exposed arcuate edge portion 84 becomes worn, the user can rotate the circular blade to expose a sharper arcuate edge portion 82.

Advantageously, the rotatable blade 18 may include index means 86 for enabling rotation of the blade 18 to selected positions. Preferably, the rotatable blade 18 has about six arcuate edge portions 82, 84. Thus the blade 18 is indexed such that a user will rotate the blade 18 approximately 60 angular degrees in order to expose an adjacent arcuate edge portion 82, 84.

Turning again to FIG. 5, it can be seen that the index means 86 may take the form of an aperture 90 in the middle of the blade 18, and a bolt 46 through the aperture 90 such that the blade 18 can be rotated around said bolt 46 to selected angular positions. More particularly, the aperture 90 is shaped like a polygon with approximately six sides 92 of equal length. Securing the blade 18 to the head 44 of the pruning apparatus 10 is the bolt 46, with a shank 94 fitting the dimensions of the aperture 90. Thus, in order to utilize the index means 86, a user 14 will detach the blade 18 from the head 44, rotate the blade 18, and thereafter reposition the blade 18 around the bolt 46 with new arcuate edge portion 82 exposed. The index means 86 ensures the proper angle of rotation. Because of its plurality of arcuate edge portions 82, 84, the present invention provides a lifetime of use with a single circular blade 18. However, the blade 18 may be replaced in its entirety if so required.

Figure 8A:
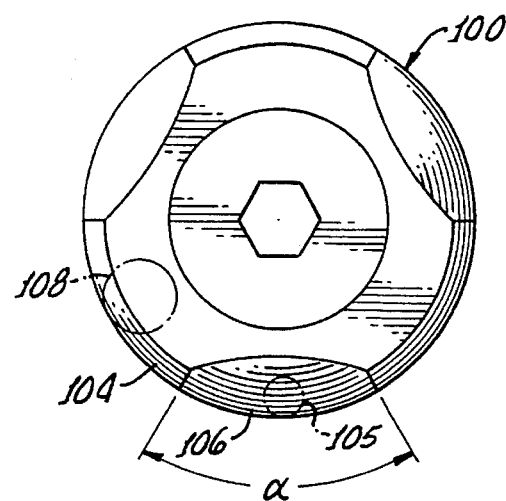
FIG. 8A shows an alternative circular blade.

FIG. 8A illustrates an alternative embodiment of the present invention which provides a circular blade 100 with several distinct arcuate sections around the blade circumference. The blade 100 may have from two to about six distinct arcuate sections 104, 106, each adapted for a particular pruning requirement. Thus, for example, by rotating the blade 100, utilizing the index means 86 described above, a user 14 can expose an arcuate edge portion designed for cutting through mature rather than sapling branches of a plant.

For example, arcuate section 104 is suitable for cutting through tough, mature branches of a plant 12. It has a wide angle cross-section that will not tend to yield when driven through a solid branch 108. In contrast, arcuate section 106 is most effective for pruning softer branches, such as new growth. This arcuate section 106 is relatively narrow angled, thus it tends to be thinner than the aforementioned arcuate section 104. It is designed to cut cleanly through a soft branch 110.

Turning now again to FIGS. 2, 3 and 4, a handle 20 is provided for operating the pruning means 16. The handle 20 may be comprised of two levers 40, 42. As can be seen in FIG. 2, lever 40 may be connected to the holding jaw 60, and lever 42 may be connected to the head 44. The jaw 60 and the head 44 are then pivotally connected together at a point 120. A user 14 prunes a particular branch of a plant 12 by drawing the levers 40, 42 together which results in closure of the blade 18 around and through the branch.

The handle 20 also operates the holding means 22. Generally, the holding means 22 secures a severed piece 24 of the plant 12 the instant the plant 12 has been cut. The user 14 can release said piece 24, by operation of the handle 20 at any time and at any place he so-chooses. More particularly, the user 14 single handedly pulls the levers 40, 42 together to prune the plant 12 and then can release the severed piece by merely unflexing his hand 122. This release action can be facilitated by the use of a spring 124 installed near the pivotal point 120 of the levers 40, 42. The spring 124 provides an opening force between the levers 40, 42 and thus facilitates the easy release of the holding means 22.

Another embodiment of the present invention includes means for shielding a user from harmful plant contact. In particular, shields 130, 132 are provided to be used alone or in conjunction with each other. These shields 130, 132 are illustrated in FIGS. 1, 2, 3 and 5.

The first type of shield is a sectional shield 130, comprised of at least one member 134, 136 extending over the handle 20. The members 134, 136 surround, at least partially, a user's hand 122 when the user 14 is gripping the levers 40, 42.

FIG. 5 shows in perspective an embodiment of the present invention including two sectional shield members 134, 136. The sectional shield members 134, 136 are positioned and shaped to protect the most vulnerable portions of a user's hand 122 without compromising maneuverability of the pruning apparatus 10.

More specifically, sectional shield member 134 is attached to lever 40 near pivotal point 120. It is approximately rectangular in shape, with a shallow curvature, and it extends over and protects a user's thumb 140. Sectional shield member 136 is generally larger than the aforementioned sectional shield member 134. It is attached to lever 42 near the pivotal point 120 and also at the other end of the lever 42 for stability. It is approximately oval in shape, curving shallowly over a user's fingers and knuckles 142.

Referring to FIG. 3, a sectional shield member may be made of any material that is sufficiently strong to prevent penetration thereof by plant thorns 138.

In addition to the sectional shield 130, a sleeve shield 132 may be provided. The sleeve shield 132, illustrated in FIGS. 1 and 2, is designed for more extensive protection than the prior discussed sectional shield 130. Preferably, the sleeve shield 132 is removably attached to the pruning apparatus 10 by a securing device, such one or more snap fasteners 144, positioned near the pivotal point 120. The user 14 can therefore use the pruning apparatus 10 with or without the sleeve shield 132, depending upon the circumstances and his personal preference.

As shown in FIG. 1, the sleeve shield 132 provides complete protection for a user's hand 122 and arm 152, up to approximately a user's elbow. This is particularly advantageous when a user is pruning dense foliage, such as the illustrated rose plant 12, in which he must reach considerably inside the foliage.

As the sleeve shield 132 covers a substantial portion of a user's arm 152, it is preferably made of a strong and breathable material, such as a canvas fabric or the like. Preferably, elastic (not shown) is installed within the sleeve shield at an edge nearest the user's elbow. The elastic tends to hold the sleeve shield 132 properly in place during use of the pruning apparatus 10.

Figure 9:
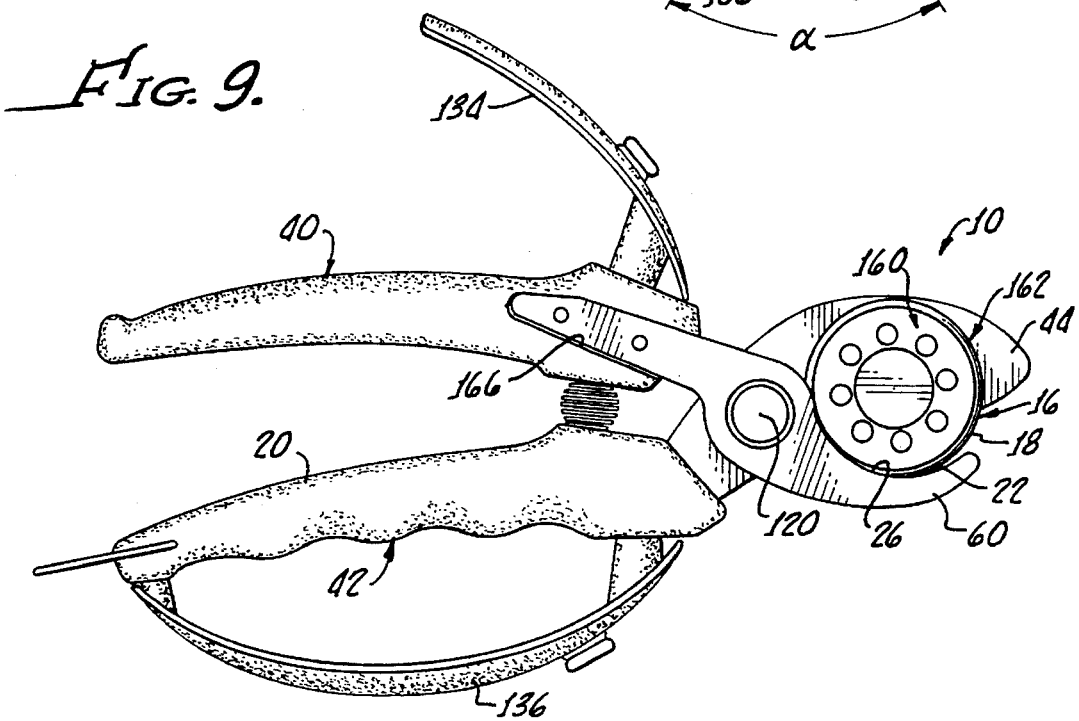
FIG. 9 shows a perspective view of an embodiment of the present invention as assembled for left handed use.

FIG. 9 illustrates another embodiment of the present invention. Here is shown an embodiment of the present invention as assembled to facilitate left-handed rather than right-handed use. Referring now to both FIGS. 5 and 9, for purpose of comparison, this embodiment includes means for enabling the holding means 22 to be disposed on either of two sides 160, 162 of the cutting blade 18 in order to alternatively facilitate left-handed or right-handed use. Furthermore, notch 166, and an identical, mirror-image notch 66 (shown in FIG. 5) provide a means for placing the holding jaw 60 on either of two sides of the lever 40. As thus assembled, the present invention provides the proper bias for left-handed users as previously noted.

Although there has been hereinabove described circular-bladed pruning shears with holding action for the purpose of illustrating the manner in which the present invention may be used to advantage, it should be understood that the invention is not limited thereto. Therefore, any and all modifications, variations, or equivalent arrangements which may occur to those skilled in the art, should be considered to be within the scope and the spirit of the present invention as defined in the claims.

What is claimed is:

1. An apparatus for pruning plants, said apparatus comprising:

pruning means, including a cutting blade, for cutting a plant;

handle means, for operating said pruning means;

holding means, operative by said handle means, for securing a severed piece of said plant until said handle means is released; and sleeve shield means, comprising a flexible sleeve extending over said handle means up to approximately a user's elbow, for protecting a user's hand from injury.

2. The apparatus according to claim 1 wherein the holding means comprises a first holding edge and a second holding edge, said holding edges cooperating with each other to secure the severed piece.

3. The apparatus according to claim 2 wherein said first holding edge is serrated.

4. The apparatus according to claim 3 wherein said first holding edge is laterally serrated.

5. The apparatus according to claim 3 wherein said first holding edge is longitudinally serrated.

6. The apparatus according to claim 2 wherein said second holding edge is made of a smooth, rubberlike material.

7. The apparatus according to claim 1 further comprising sectional shield means, comprised of at least one member extending over said handle means, for protecting a user's hand from injury.

8. The apparatus according to claim 1 wherein said sleeve shield means is removably attached to said apparatus.

9. The apparatus according to claim 1 further comprising means for enabling said holding means to be disposed on either of two sides of the cutting blade in order to facilitate use of the apparatus by right and left handed users.

10. An apparatus for pruning plants, said apparatus comprising:

pruning means, including a rotatable blade, for cutting a plant;

means for rotating said rotatable blade in order to expose a portion of the rotatable blade for cutting a plant;

handle means for operating said pruning means; and holding means, operative by said handle means, for securing a severed piece of said plant until said handle means is released.

11. The apparatus according to claim 10 wherein the rotatable blade is circular shaped.

12. The apparatus according to claim 10 further comprising removably attached sleeve shield means, extending over said handle means up to approximately a user's elbow, for protecting a user's hand and arm from injury.

13. The apparatus according to claim 10 wherein said apparatus further comprises means for enabling said holding means to be disposed on either of two sides of the rotatable blade in order to facilitate use of the apparatus by right and left handed users.

14. An apparatus for pruning plants, said apparatus comprising:

pruning means, including a circular shaped blade, for cutting a plant;

means for rotating said circular shaped blade in order to expose a portion of the circular shaped blade, said means for rotating including index means for enabling rotation of the circular shaped blade to selected positions; and handle means for operating said pruning means.

15. The apparatus according to claim 14 wherein the circular shaped blade has a uniform circular cutting edge.

16. The apparatus according to claim 14 wherein the circular shaped blade includes at least two distinct arcuate edge portions thereon, each said edge portion adapted for a particular pruning requirement.

17. The apparatus according to claim 14 further comprising holding means, operative by said handle means, for securing a severed piece of said plant until said handle means is released.

18. The apparatus according to claim 17 wherein the holding means comprises a first holding edge that is serrated, and a second holding edge that made of a smooth rubberlike material, wherein both said holding edges cooperate with each other to form the holding means.

19. The apparatus according to claim 17 further comprising sectional shield means, comprised of at least one member extending over said handle means, for protecting a user's hand from injury.

* * * * *